US012723963B2

(12) United States Patent
Shao et al.

(10) Patent No.: US 12,723,963 B2
(45) Date of Patent: Sep. 1, 2026

(54) METHOD FOR EVALUATING ON-SITE DESORPTION EFFECT OF ACTIVATED COKE

(71) Applicant: INSTITUTE OF RESEARCH OF IRON AND STEEL, JIANGSU PROVINCE/SHA-STEEL, CO. LTD (CN), Suzhou (CN)

(72) Inventors: Jiugang Shao, Suzhou (CN); Rui Mao, Suzhou (CN); Hang Su, Suzhou (CN); Tao Li, Suzhou (CN)

(73) Assignee: INSTITUTE OF RESEARCH OF IRON AND STEEL, JIANGSU PROVINCE/SHA-STEEL, CO. LTD (CN), Suzhou (CN)

( * ) Notice: Subject to any disclaimer, the term of this patent is extended or adjusted under 35 U.S.C. 154(b) by 268 days.

(21) Appl. No.: 18/726,724

(22) PCT Filed: Jan. 18, 2023

(86) PCT No.: PCT/CN2023/072771
§ 371 (c)(1),
(2) Date: Jul. 3, 2024

(87) PCT Pub. No.: WO2024/103524
PCT Pub. Date: May 23, 2024

(65) Prior Publication Data
US 2025/0093250 A1 Mar. 20, 2025

(30) Foreign Application Priority Data
Nov. 16, 2022 (CN) ......................... 202211461771.1

(51) Int. Cl.
*G01N 1/28* (2006.01)
*G01N 15/08* (2006.01)
(Continued)

(52) U.S. Cl.
CPC ............. *G01N 15/08* (2013.01); *G01N 1/286* (2013.01); *G01N 2001/2866* (2013.01); *G01N 2015/0866* (2013.01)

(58) Field of Classification Search
CPC ................... G01N 15/08; G01N 1/286; G01N 2001/2866; G01N 2015/0866; G01N 1/44;
(Continued)

(56) References Cited

U.S. PATENT DOCUMENTS

| | | | |
|---|---|---|---|
| 4,737,610 | A | 4/1988 | Kotsch |
| 2021/0245096 | A1 | 8/2021 | Wang et al. |

FOREIGN PATENT DOCUMENTS

| | | | | |
|---|---|---|---|---|
| CN | 103983545 | A * | 8/2014 | ............. G01N 15/00 |
| CN | 104209107 | A | 12/2014 | |

(Continued)

OTHER PUBLICATIONS

CN First Office Action dated Mar. 27, 2025 in application No. 202211461771.1.

(Continued)

*Primary Examiner* — Laura Martin Sweeney
*Assistant Examiner* — Anthony W Megna Fuentes
(74) *Attorney, Agent, or Firm* — Maschoff Brennan

(57) ABSTRACT

A method for evaluating an on-site desorption effect of activated coke. An on-site desorption effect of activated coke is evaluated in combination with a laboratory simulation desorption process, an activated-coke desorption rate R is calculated by means of measuring the sulfur content of activated-coke samples before and after on-site desorption and the sulfur content of an activated-coke sample after laboratory simulation desorption, and then the on-site desorption effect of activated coke is evaluated, so as to ensure the recycling effect of activated coke. Therefore, the prob- (Continued)

lem of it being impossible to accurately evaluate the on-site desorption effect of activated coke is solved, and an important guidance is provided for on-site process optimization control.

9 Claims, 1 Drawing Sheet

(51) Int. Cl.
*G01N 33/00* (2006.01)
*G01N 33/22* (2006.01)
*G01N 1/44* (2006.01)

(58) Field of Classification Search
CPC .... G01N 33/0042; G01N 33/222; G01N 1/28; G01N 2015/0833
See application file for complete search history.

(56) References Cited

FOREIGN PATENT DOCUMENTS

| | | | |
|---|---|---|---|
| CN | 108776192 | A | 11/2018 |
| CN | 111983131 | A | 11/2020 |
| CN | 112525764 | A | 3/2021 |
| CN | 114324435 | A | 4/2022 |
| JP | S56126427 | A | 10/1981 |
| JP | 61501499 | A | 7/1986 |
| JP | S61274744 | A | 12/1986 |
| JP | H06-142507 | A | 5/1994 |
| JP | 2014102139 | A | 6/2014 |
| JP | 2020-025934 | A | 2/2020 |
| WO | 8504343 | A1 | 10/1985 |

OTHER PUBLICATIONS

JP First Office Action dated Jun. 3, 2025 in application No. 2024541094.

CN Second Office Action dated Jul. 26, 2025 in application No. 202211461771.1.

EP Search Report dated Apr. 22, 2025 in application 23889976.9.

Li Jun et al., "Study on sulfur migration in activated carbon adsorption-desorption cycle: Effect of alkali/alkaline earth metals," Journalofenvironmentalscienceselsevierbv, NL, vol. 99, Jul. 2, 2020(Jul. 2, 2020), ppp. 119-129, XP086338122.

Xinzhilian Elise (Shanghai) Exhibition Service Co., Ltd., "Powder Characterization Analyzer", Encyclopedia of China Advanced Ceramics Industry, China Building Materials Industry Press, May 31, 2021, p. 423.

Jin Chenghu et al., "Design and Operation Control of Desorption Towers", Yizhong Technology, Dec. 31, 2021, p. 27-29.

Lin Zongshou et al., "5000 Questions on Cement and Concrete Science and Technology", Aug. 31, 2021, pp. 419-420.

Zhao, H. et al., "Chapter 1 Section 4 Active coke analysis," Activated Coke Desulfurization and Denitrification Technology Questions and Answers, pp. 68-71 (Jul. 31, 2020).

International Search Report and Written Opinion of the International Searching Authority dated Aug. 8, 2023 as received in Application No. PCT/CN2023/072771.

* cited by examiner

METHOD FOR EVALUATING ON-SITE DESORPTION EFFECT OF ACTIVATED COKE

CROSS-REFERENCE TO RELATED APPLICATIONS

The present application claims priority to Chinese Patent Application No. 20221146177.1, filed to the China Patent Office on Nov. 16, 2022 and entitled "METHOD FOR EVALUATING ON-SITE DESORPTION EFFECT OF ACTIVATED COKE", the entire contents of which are incorporated herein by reference.

TECHNICAL FIELD

The present application belongs to the technical field of activated-coke desulfurization and denitrification, and particularly relates to a method for evaluating an on-site activated coke desorption effect.

BACKGROUND

An activated-coke desulfurization and denitrification technology is a dry-method flue gas treatment technology that utilizes adsorption and catalytic functions of activated coke to integrally remove multiple pollutants such as $SO_2$, $NO_x$, particulate matter, mercury, dioxins, furan, heavy metals, and volatile organic compounds from flue gas. The activated-coke desulfurization and denitrification technology has good pollutant removal effect, low energy consumption, no white smoke, and recyclability in by-products, and is an economically effective and highly promising flue gas purification technology. In recent years, an activated-coke desulfurization and denitrification process has been widely used in procedures such as sintering, pelletizing, and coking in steel enterprises, and has achieved excellent effects in flue gas purification, solid waste reduction, resource recovery and other aspects. The activated-coke desulfurization and denitrification process started earlier in China and gradually achieved large-scale application after 2018. However, limited by the short application time, there are still many problems with the activated-coke process in actual production. In nearly a hundred devices that have been put into operation, problems such as ignition of activated coke, crystallization and accumulation in an ammonia-air mixing zone, corrosion of steel structures, and blockage of material circulation systems frequently occur, posing great troubles to stable production and ultra-low emissions.

Activated coke for desulfurization and denitrification is a porous carbon-containing material made from coal as a raw material, and has a large specific surface area and rich pore structures, as well as performance of pressure resistance, impact resistance, and wear resistance. During desulfurization and denitrification, the activated coke performs physical adsorption and chemical adsorption on $SO_2$ in an adsorption tower through internal micropores, and catalyzes a selective catalytic reduction (SCR) reaction between NOx and NH3 through surface active groups to generate $N_2$. After adsorption and saturation, the activated coke enters a regeneration tower and is subjected to a high temperature around 400° C. to remove adsorbed matter, and the activated coke recovers its adsorption capacity and enters the adsorption tower again for the next adsorption. However, in an activated coke flue gas desulfurization and denitrification system, although activated coke can be reused, the reuse effect of the activated coke after adsorbing various pollutants depends on the quality of a desorption process. Moreover, during recycling after the desorption process, the desorption effect of the activated coke is crucial for stable operation of the flue gas desulfurization and denitrification system. The desorption process refers to the recovery of a desulfurization and denitrification function of the activated coke by heating it to 400° C. or above under nitrogen protection to release its adsorbed sulfur, ammonium salts, etc. Researches have shown that there is a certain correlation between the difference in repeated application performance effect of the activated coke and a poor desorption effect of the activated coke. In addition, in actual production, the desorption effect of activated coke has certain fluctuations according to changes in on-site process conditions, which has a significant impact on a flue gas purification effect and stable operation of the devices. However, there is currently no method for evaluating the desorption effect of activated coke. The current market's related technologies focus on the design of on-site production equipment, and there are no relevant research reports on the evaluation of the desorption effect of activated coke during use.

In the desorption process of the activated coke, due to the fact that ammonium salt particles can generally achieve rapid decomposition at 300° C., the main limiting link in the desorption process of activated coke is the release of sulfur. Therefore, a sulfur desorption rate is used as an evaluation index for the desorption effect in production. Sulfur in the activated coke contains decomposable sulfur and fixed sulfur, wherein the decomposable sulfur mainly includes sulfuric acid, ammonium sulfate, etc., which can be fully released in the desorption process; and the fixed sulfur is mainly composed of calcium sulfate, potassium sulfate, etc., which are generated by the sulfur adsorbed by the activated coke and calcium-containing dust in flue gas, a decomposition temperature of the fixed sulfur is 1200° C. or above, and the fixed sulfur will not be decomposed in the desorption process. Although a sulfur content after desorption can be determined through daily sampling detection, due to the difficulty in measuring the fixed sulfur, a desorption rate cannot be calculated, and the desorption effect of the activated coke also cannot be effectively evaluated. Therefore, developing a method for evaluating the desorption effect of activated coke, especially a method for effectively evaluating an on-site desorption effect of activated coke, has positive significance.

SUMMARY OF THE INVENTION

For this purpose, the technical problem to be solved by the present application is to provide a method for evaluating an on-site desorption effect of activated coke based on laboratory evaluation. The method may measure decomposable sulfur and fixed sulfur in activated coke, and evaluate the on-site desorption effect of the activated coke through data comparison, which solves the problem that the desorption effect of activated coke recycled on site cannot be accurately evaluated, and provides important guidance for on-site process optimization control.

In order to solve the above technical problem, a method for evaluating an on-site desorption effect of activated coke of the present application includes the following steps:

(1) taking and grinding an activated-coke sample 1 before on-site desorption into powder, and measuring a sulfur content of the powder, which is recorded as S1 in %;

(2) taking and grinding an activated-coke sample 2 after on-site desorption into powder, and measuring a sulfur content of the powder, which is recorded as S2 in %;

(3) performing a desorption experiment using the activated-coke sample 1 according to operation parameters of the on-site desorption work, collecting and grinding an activated-coke sample 3 after the desorption experiment into powder, and measuring a sulfur content of the powder, which is defined as a fixed sulfur content and recorded as S3 in %;

(4) defining an activated-coke desorption rate R which is the desorption rate of sulfur that can be desorbed in the activated coke through an on-site desorption tower, and calculating the activated-coke desorption rate R by S1, S2 and S3, a calculation formula being:

$$R = \frac{S1 - S2}{S1 - S3} \times 100\%;$$

and (5) evaluating the on-site desorption effect of activated coke according to a calculated value of the activated-coke desorption rate R.

Specifically, in the steps (1), (2) and (3), the step of measuring the sulfur content is performed using a carbon sulfur analyzer.

Specifically, in the steps (1), (2) and (3), a powder particle size is independently controlled to be less than or equal to 100 meshes in the grinding steps.

Specifically, in the steps (1) and (2), the activated-coke sample 1 and the activated-coke sample 2 are the same in amount.

Specifically, in the step (3), the desorption experiment is carried out using a tubular furnace.

Specifically, in the step (3), parameters of the desorption experiment include: desorption time being greater than or equal to 40 min, a desorption temperature being 440° C., and a nitrogen flow rate being in a range from 40 to 60 L/h.

Specifically, in the method for evaluating the on-site desorption effect of the activated coke, in the step (5), the step of evaluating includes:

a, if the calculated desorption rate R is less than 90%, evaluating that the desorption of activated coke is not complete, adjusting process parameters of the on-site desorption tower, performing resampling and repeating step (1) to step (4) until R is greater than or equal to 90%; and b, if the calculated desorption rate R is greater than or equal to 90%, evaluating that the desorption effect is able to meet process requirements and on-site desorption parameters do not need to be changed.

Specifically, in the step (5), the step of adjusting the process parameters of the on-site desorption tower includes adjusting the desorption temperature, adjusting the nitrogen flow rate and/or adjusting the desorption time.

Specifically, in the step (5), it further includes the step of resampling and repeating step (1) to step (4) after adjusting the process parameters of the on-site desorption tower to be stable for at least 3 h.

The present application further discloses an application of the method for evaluating the on-site desorption effect of the activated coke in evaluating the performance of activated coke.

In the method for evaluating the on-site desorption effect of the activated coke of the present application, the on-site desorption effect of the activated coke is evaluated in combination with a laboratory simulation desorption procedure, not only can decomposable sulfur and fixed sulfur in activated coke be measured, but also the on-site desorption effect of the activated coke can be evaluated through data comparison, and the on-site desorption effect of the activated coke can be evaluated to guarantee a recycling effect of the activated coke, solve the problem that the on-site desorption effect of the activated coke cannot be accurately evaluated, and provide important guidance for on-site process optimization control.

BRIEF DESCRIPTION OF THE DRAWINGS

In order to make the content of the present application easier to understand clearly, the present application is further described in detail below according to specific examples of the present application and in conjunction with the accompanying drawings, in which.

Figure 1:
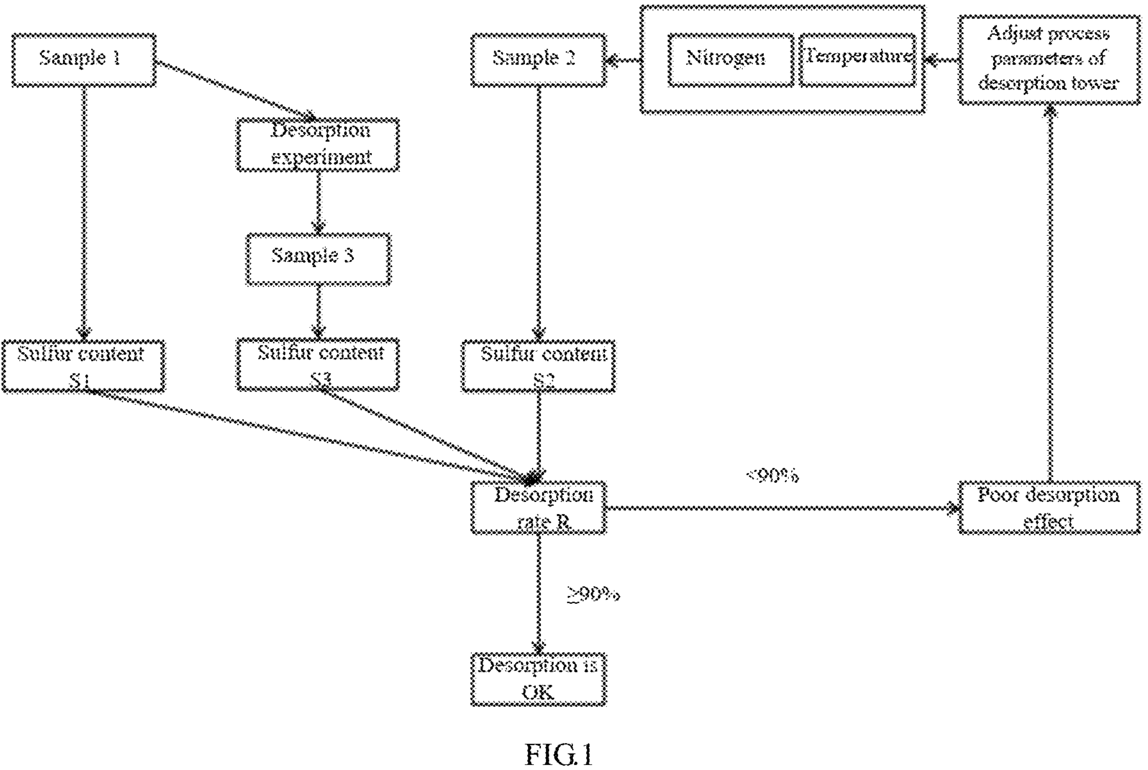
FIG. 1 is an operation schematic diagram of a method for evaluating a desorption effect of activated coke. In the figure, a sample 1 is activated coke before on-site desorption, a sample 2 is activated coke after on-site desorption, a sample 3 is activated coke after laboratory desorption, a sulfur content S1 is a percentage of a sulfur content of the activated coke before on-site desorption, a sulfur content S2 is a percentage of a sulfur content of the activated coke after on-site desorption, and a sulfur content S3 is a percentage of a sulfur content of the activated coke after laboratory desorption.

The reference numerals in the figures are: 1—gas inlet, 2—heating body, 3—constant temperature zone, 4—reaction tube, 5—gas outlet, and 6—control panel.

DETAILED DESCRIPTION

Figure 2:
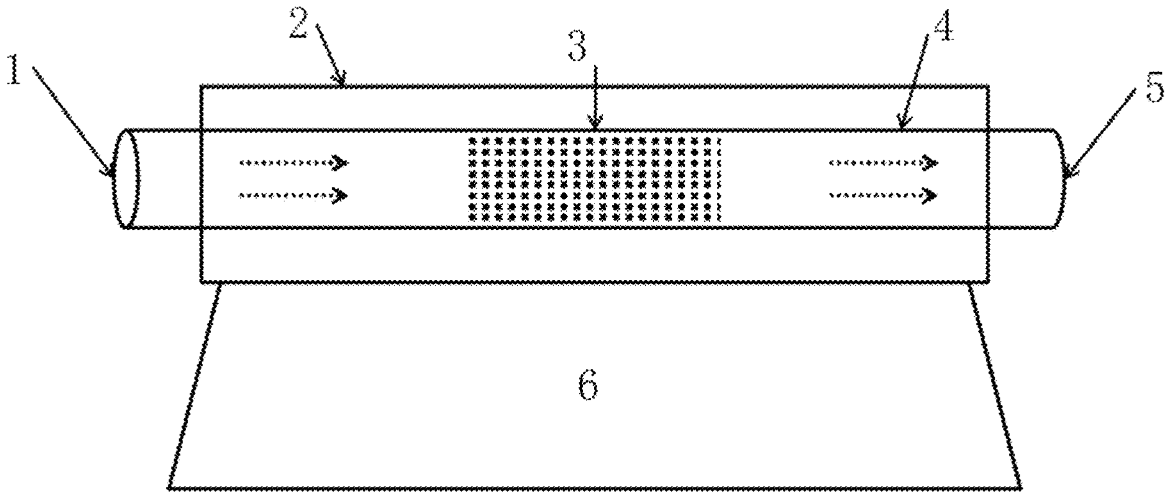
FIG. 2 is an activated-coke desorption simulation experiment device.

In the following examples of the present application, a horizontal tubular furnace as shown in FIG. 2 is adopted as a simulation experiment device for a simulation desorption experiment of an activated-coke sample in a laboratory.

As for the horizontal tubular furnace as shown in FIG. 2, a desorption simulation experiment is carried out by introducing protective nitrogen into the horizontal tubular furnace. The activated-coke sample is placed in an activated-coke filling region within a reaction tube 4, namely a constant temperature zone 3 portion, the nitrogen is controlled to enter the reaction tube 4 from a gas inlet 1 and flow out from a gas outlet 5 of the reaction tube 4, a temperature in the desorption experiment is controlled by a heating body 2, and reaction parameters are controlled by a control panel 6. The desorption simulation experiment for the activated-coke sample is completed.

In addition, it is to be noted that, in following solutions of the examples of the present application, in a step of detecting each activated-coke sample using a carbon sulfur analyzer, parameters and conditions in detection of different samples can be controlled to be the same according to mode conditions of the carbon sulfur analyzer.

Example 1

According to an operation flowchart as shown in FIG. 1, a method for evaluating an on-site desorption effect of activated coke of this example includes the following steps:

(1) an activated-coke sample 1 before desorption is taken on site, 30 g of the activated-coke sample 1 is weighed and ground into powder less than or equal to 100 meshes, and a sulfur content S1 of the powder is measured using a carbon sulfur analyzer to be 3.52%;

(2) an activated-coke sample 2 after desorption is taken on site, 30 g of the activated-coke sample 2 is weighed and ground into powder less than or equal to 100 meshes, and a sulfur content S2 of the powder is measured using the carbon sulfur analyzer to be 2.11%;

(3) a desorption experiment is carried out on the activated-coke sample 1 using a tubular furnace as shown in FIG. 2, wherein experiment parameters are as follows: an amount of activated coke is 40 g, desorption time is 40 min, a desorption temperature is 440° C., and a nitrogen flow rate is 40 L/h;

an activated-coke sample 3 after desorption is obtained through the above desorption experiment, 30 g of the activated-coke sample 3 is weighed and ground into powder less than or equal to 100 meshes, and a sulfur content S3 of the powder is measured using the carbon sulfur analyzer to be 1.65%, wherein the sulfur content after desorption under this parameter condition is defined as a fixed sulfur content;

(4) an activated-coke desorption rate R is defined, namely the desorption rate of sulfur that can be desorbed in the activated coke through an on-site desorption tower, the activated-coke desorption rate R is calculated by S1, S2 and S3, and the desorption rate R is calculated to be equal to 75.4% according to the following formula;

$$R = \frac{S1 - S2}{S1 - S3} \times 100\%;$$

and (5) in the solution of this example, the desorption rate R is calculated to be less than 90%, it indicates that the activated coke is not thoroughly desorbed, on site, the desorption temperature is increased from 400° C. to 420° C., the nitrogen amount is increased from 21 L/kg to 35 L/kg, resampling and repeating step (1) to step (4) are performed after the parameters are stabilized for 3 h, S1, S2 and S3 are measured again to be 3.53%, 1.82% and 1.65% respectively, and R after adjustment is calculated to be equal to 91.0% according to the above formula.

With the process after adjustment, the desorption rate R is calculated to be greater than or equal to 90%, it is detected that, after on-site desorption, the capabilities of adsorbing sulfur and catalytically reducing nitric oxides of the activated coke are both fully recovered, the desorption performance can completely meet process requirements, and on-site desorption parameters do not need to be changed. It is proved that the method of the present application has an accurate evaluation result for the desorption effect of the activated coke.

Example 2

According to an operation flowchart as shown in FIG. 1, a method for evaluating an on-site desorption effect of activated coke of this example includes the following steps:

(1) an activated-coke sample 1 before desorption is taken on site, 30 g of the activated-coke sample 1 is weighed and ground into powder less than or equal to 100 meshes, and a sulfur content S1 of the powder is measured using a carbon sulfur analyzer to be 4.02%;

(2) an activated-coke sample 2 after desorption is taken on site, 30 g of the activated-coke sample 2 is weighed and ground into powder, and a sulfur content S2 of the powder is measured using the carbon sulfur analyzer to be 1.95%;

(3) a desorption experiment is carried out on the activated-coke sample 1 using a tubular furnace as shown in FIG. 2, wherein experiment parameters are as follows: an amount of activated coke is 40 g, desorption time is 40 min, a desorption temperature is 440° C., and a nitrogen flow rate is 40 L/h;

an activated-coke sample 3 after desorption is obtained through the above desorption experiment, 30 g of the activated-coke sample 3 is weighed and ground into powder less than or equal to 100 meshes, and a sulfur content S3 of the powder is measured using the carbon sulfur analyzer to be 1.72%, wherein the sulfur content after desorption under this parameter condition is defined as a fixed sulfur content;

(4) an activated-coke desorption rate R is defined, namely the desorption rate of sulfur that can be desorbed in the activated coke through an on-site desorption tower, the activated-coke desorption rate R is calculated by S1, S2 and S3, and the desorption rate R is calculated to be equal to 90% according to the following formula;

$$R = \frac{S1 - S2}{S1 - S3} \times 100\%;$$

and (5) in the solution of this example, the desorption rate R is calculated to be greater than or equal to 90%, it is detected that, after on-site desorption, the capabilities of adsorbing sulfur and catalytically reducing nitric oxides of the activated coke are both fully recovered, the desorption performance can completely meet process requirements, and on-site desorption parameters do not need to be changed. It is proved that the method of the present application has an accurate evaluation result for the desorption effect of the activated coke.

Example 3

According to an operation flowchart as shown in FIG. 1, a method for evaluating an on-site desorption effect of activated coke of this example includes the following steps:

(1) an activated-coke sample 1 before desorption is taken on site, 30 g of the activated-coke sample 1 is weighed and ground into powder less than or equal to 100 meshes, and a sulfur content S1 of the powder is measured using a carbon sulfur analyzer to be 3.97%;

(2) an activated-coke sample 2 after desorption is taken on site, 30 g of the activated-coke sample 2 is weighed and ground into powder less than or equal to 100 meshes, and a sulfur content S2 of the powder is measured using the carbon sulfur analyzer to be 2.03%;

(3) a desorption experiment is carried out on the activated-coke sample 1 using a tubular furnace as shown in FIG. 2, wherein experiment parameters are as follows: an amount of activated coke is 40 g, desorption time is 40 min, a desorption temperature is 440° C., and a nitrogen flow rate is 40 L/h;

an activated-coke sample 3 after desorption is obtained through the above desorption experiment, 30 g of the activated-coke sample 3 is weighed and ground into powder less than or equal to 100 meshes, and a sulfur content S3 of the powder is measured using the carbon sulfur analyzer to be 1.75%, wherein the sulfur content after desorption under this parameter condition is defined as a fixed sulfur content;

(4) an activated-coke desorption rate R is defined, namely the desorption rate of sulfur that can be desorbed in the activated coke through an on-site desorption tower, the activated-coke desorption rate R is calculated by S1, S2 and S3, and the desorption rate R is calculated to be equal to 87.4% according to the following formula;

$$R = \frac{S1 - S2}{S1 - S3} \times 100\%;$$

and (5) in the solution of this example, the desorption rate R is calculated to be less than 90%, it indicates that the activated coke is not thoroughly desorbed, on site, the desorption temperature is increased from 400° C. to 420° C., the nitrogen amount is decreased from 50 L/kg to 35 L/kg, resampling and repeating step (1) to step (4) are performed after the parameters are stabilized for 3 h, S1, S2 and S3 are measured again to be 3.53%, 1.82% and 1.65% respectively, and R after adjustment is calculated to be equal to 91.0%; and with the process after adjustment, the desorption rate R is calculated to be greater than or equal to 90%, it is detected that, after on-site desorption, the capabilities of adsorbing sulfur and catalytically reducing nitric oxides of the activated coke are both fully recovered, the desorption performance can completely meet process requirements, and on-site desorption parameters do not need to be changed. It is proved that the method of the present application has an accurate evaluation result for the desorption effect of the activated coke.

Example 4

According to an operation flowchart as shown in FIG. 1, a method for evaluating an on-site desorption effect of activated coke of this example includes the following steps:

(1) an activated-coke sample 1 before desorption is taken on site, 30 g of the activated-coke sample 1 is weighed and ground into powder less than or equal to 100 meshes, and a sulfur content S1 of the powder is measured using a carbon sulfur analyzer to be 4.53%;

(2) an activated-coke sample 2 after desorption is taken on site, 30 g of the activated-coke sample 2 is weighed and ground into powder less than or equal to 100 meshes, and a sulfur content S2 of the powder is measured using the carbon sulfur analyzer to be 2.23%;

(3) a desorption experiment is carried out on the activated-coke sample 1 using a tubular furnace as shown in FIG. 2, wherein experiment parameters are as follows: an amount of activated coke is 40 g, desorption time is 40 min, a desorption temperature is 440° C., and a nitrogen flow rate is 40 L/h;

an activated-coke sample 3 after desorption is obtained through the above desorption experiment, 30 g of the activated-coke sample 3 is weighed and ground into powder less than or equal to 100 meshes, and a sulfur content S3 of the powder is measured using the carbon sulfur analyzer to be 1.83%, wherein the sulfur content after desorption under this parameter condition is defined as a fixed sulfur content;

(4) an activated-coke desorption rate R is defined, namely the desorption rate of sulfur that can be desorbed in the activated coke through an on-site desorption tower, the activated-coke desorption rate R is calculated by S1, S2 and S3, and the desorption rate R is calculated to be equal to 85.2% according to the following formula;

$$R = \frac{S1 - S2}{S1 - S3} \times 100\%;$$

and (5) in the solution of this example, the desorption rate R is calculated to be less than 90%, it indicates that the activated coke is not thoroughly desorbed, on site, the desorption temperature is increased from 403° C. to 415° C., the nitrogen amount is increased from 30 L/kg to 45 L/kg, resampling and repeating step (1) to step (4) are performed after the parameters are stabilized for 3 h, S1, S2 and S3 are measured again to be 4.48%, 1.92% and 1.78% respectively, and R after adjustment is equal to 94.8%; and with the process after adjustment, the desorption rate R is calculated to be greater than or equal to 90%, it is detected that, after on-site desorption, the capabilities of adsorbing sulfur and catalytically reducing nitric oxides of the activated coke are both fully recovered, the desorption performance can completely meet process requirements, and on-site desorption parameters do not need to be changed. It is proved that the method of the present application has an accurate evaluation result for the desorption effect of the activated coke.

Obviously, the above examples are only for the purpose of clearly illustrating the instances provided, rather than limiting the embodiments. For those of ordinary skill in the art, other different forms of changes or variations can further be made based on the above explanation. It is not necessary and impossible to exhaustively list all embodiments here. The obvious changes or variations arising from this are still within the scope of protection of the present application.

The invention claimed is:

1. A method for evaluating an on-site desorption effect of activated coke, comprising the following steps:

(1) taking and grinding an activated-coke sample 1 before on-site desorption into powder, and measuring a sulfur content of the powder, which is recorded as S1 in %;

(2) taking and grinding an activated-coke sample 2 after on-site desorption into powder, and measuring a sulfur content of the powder, which is recorded as S2 in %;

(3) performing a desorption experiment using the activated-coke sample 1 according to operation parameters of the on-site desorption work, collecting and grinding an activated-coke sample 3 after the desorption experiment into powder, and measuring a sulfur content of the powder, which is defined as a fixed sulfur content and recorded as S3 in %;

(4) defining an activated-coke desorption rate R, which is the desorption rate of sulfur that can be desorbed in the activated coke through an on-site desorption tower, and calculating the activated-coke desorption rate R by S1, S2 and S3, a calculation formula being:

$$R = \frac{S1 - S2}{S1 - S3} \times 100\%;$$

and (5) evaluating the on-site desorption effect of activated coke according to a calculated value of the activated-coke desorption rate R;

wherein in the step (3), parameters of the desorption experiment comprise: desorption time being greater than or equal to 40 min, a desorption temperature being 440° C., and a nitrogen flow rate being in a range from 40 to 60 L/h.

2. The method for evaluating an on-site desorption effect of activated coke according to claim 1, wherein in the steps (1), (2) and (3), the step of measuring the sulfur content is performed using a carbon sulfur analyzer.

3. The method for evaluating an on-site desorption effect of activated coke according to claim 1, wherein in the steps (1), (2) and (3), a powder particle size is independently controlled to be less than or equal to 100 meshes in the grinding steps.

4. The method for evaluating an on-site desorption effect of activated coke according to claim 1, wherein in the steps (1) and (2), the activated-coke sample 1 and the activated-coke sample 2 are the same in amount.

5. The method for evaluating an on-site desorption effect of activated coke according to claim 1, wherein in the step (3), the desorption experiment is carried out using a tubular furnace.

6. The method for evaluating an on-site desorption effect of activated coke according to claim 1, wherein in the step (5), the step of evaluating comprises:

a, if the calculated desorption rate R is less than 90%, evaluating that the desorption of activated coke is not complete, adjusting process parameters of the on-site desorption tower, performing resampling and repeating step (1) to step (4) until R is greater than or equal to 90%; and b, if the calculated desorption rate R is greater than or equal to 90%, evaluating that the desorption effect is able to meet process requirements and on-site desorption parameters do not need to be changed.

7. The method for evaluating an on-site desorption effect of activated coke according to claim 6, wherein in the step (5), the step of adjusting the process parameters of the on-site desorption tower comprises adjusting the desorption temperature, adjusting the nitrogen flow rate and/or adjusting the desorption time.

8. The method for evaluating an on-site desorption effect of activated coke according to claim 7, wherein in the step (5), it further comprises the step of resampling and repeating step (1) to step (4) after adjusting the process parameters of the on-site desorption tower to be stable for at least 3 hours.

9. An application of the method for evaluating an on-site desorption effect of activated coke according to claim 1 in evaluating the performance of activated coke.

* * * * *